United States Patent [19]
Williamson et al.

[11] Patent Number: 5,208,216
[45] Date of Patent: May 4, 1993

[54] ACRYLAMIDE TERPOLYMER SHALE STABILIZING ADDITIVE FOR LOW VISCOSITY OIL AND GAS DRILLING OPERATIONS

[75] Inventors: C. Darwin Williamson, Sugar Land, Tex.; Dodd W. Fong, Naperville, Ill.; Robert K. Gabel, Sugar Land, Tex.

[73] Assignee: Nalco Chemical Company, Naperville, Ill.

[21] Appl. No.: 906,560

[22] Filed: Jun. 30, 1992

Related U.S. Application Data

[63] Continuation-in-part of Ser. No. 714,666, Jun. 13, 1991, abandoned.

[51] Int. Cl.$^5$ ............................................. C09K 7/02
[52] U.S. Cl. ............................................. 507/120
[58] Field of Search ............................................. 507/120

[56] References Cited

U.S. PATENT DOCUMENTS

| | | | |
|---|---|---|---|
| 4,663,408 | 5/1987 | Schutz et al. | 526/240 |
| 4,664,818 | 5/1987 | Halliday et al. | 252/8.511 |
| 4,673,716 | 6/1987 | Siano et al. | 525/367 |
| 4,719,021 | 1/1988 | Branch, III | 252/8.514 |
| 4,757,863 | 7/1988 | Naimen et al. | 166/295 |
| 4,921,903 | 5/1990 | Fong | 524/555 |

OTHER PUBLICATIONS

G. M. Bol, IADC/SPE 14802, 1986.
R. P. Steiger, *Journal of Petroleum Technology*, pp. 1661–1670, Aug. 1982.
R. K. Clark et al., *Journal of Petroleum Technology*, pp. 719–727, Jun., 1976.
J. J. Sheu et al., Society of Petroleum Engineers (SPE) 18033, 1988.
J. A. Wingrave, et al., SPE 166787, 1987.
B. G. Chesser, International Association of Drilling Contractors/Society of Petroleum Engineers (IADC/SPE) 14757, 1986.

*Primary Examiner*—Gary Geist
*Attorney, Agent, or Firm*—Robert A. Miller; Daniel N. Lundeen; Andrew S. Pryzant

[57] ABSTRACT

A low viscosity drilling fluid and method for stabilizing a downhole shale formation are disclosed. The fluid comprises an aqueous solution of a partialy transamidated hydrolyzed acrylamide copolymer, potassium chloride, a weighting agent and an optional viscosifying agent. The copolymer comprises from about 50 to about 98 mole percent primary amide functionality, from about 0.1 to about 15 mole percent secondary amide functionality and from about 2 to about 50 mole percent of the acrylate salt. The drilling fluid has a density out from about 8 to about 18 pounds per gallon and a viscosity of from about 5 to about 30 centistokes.

20 Claims, No Drawings

ACRYLAMIDE TERPOLYMER SHALE STABILIZING ADDITIVE FOR LOW VISCOSITY OIL AND GAS DRILLING OPERATIONS

CROSS-REFERENCE TO RELATED APPLICATION

This is a continuation-in-part of our earlier copending application, U.S. Ser. No. 07/714,666, filed Jun. 13, 1991, now abandoned.

FIELD OF THE INVENTION

The present invention relates to drilling fluids and methods useful for stabilizing a water sensitive shale formation in oil and gas drilling operations without substantially increasing the viscosity of the drilling mud.

BACKGROUND OF THE INVENTION

In the process of drilling wells for oil and gas production, maintaining a stable borehole is of primary importance. Borehole stability is dependent on mechanical interaction between the drill string and borehole walls, as well as mechanical and chemical interactions between the drilling mud and the walls of the borehole. It is important for the drilling fluid to allow minimal hydration and dispersion of shale cuttings to prevent excessive solids buildup in the mud which can significantly increase drilling costs.

One of the most significant causes of wellbore instability is shale hydration. Shales are fine-grained, sedimentary rocks containing significant amounts of clay minerals. Shales containing high concentrations of montmorillonite, a high swelling and dispersive clay, readily swell and disperse when contacted by water, resulting in excessive solids buildup in the drilling mud. To minimize shale hydration, it is desired to utilize a drilling fluid that exhibits minimal reactivity with shale formations.

High molecular weight acrylamide/acrylate copolymer is commercially available and is well known for its ability to impart borehole stability by inhibiting shale hydration. The polymer is believed to adsorb on the positive-charged edges of the clay platelets where it acts as a protective colloid to reduce the rate of hydration of the clay without altering the internal forces holding the individual platelets together. The polymer is especially effective when it is used in conjunction with a source of potassium ions such as KCl. Sodium ions are typically found between the unit layers of clay where they are weakly held and tend to promote dispersion and swelling. Potassium ions are preferentially exchanged for the sodium ions held between the unit layers. The potassium ions combine a low hydrational energy with a small size that allows minimal hydration of the shale. The potassium ions are small enough to enter between the unit layers of clays in shales that are not highly hydrated where they are tightly held and can limit further hydration.

Although acrylamide/acrylate copolymers are readily available from various commercial suppliers, there is still a desire for a product with improved performance. Of particular interest is a chemical that would provide improved shale inhibition without increasing the viscosity of the base mud.

J. J. Sheu et al., Society of Petroleum Engineers (SPE) 18033 (1988), describes the design of improved shale stabilizing polymers by converting 20% of the carboxylate functionality of partially hydrolyzed polyacrylamide (50% carboxylate/50% amide) into alcohol groups. J. A. Wingrave et al., SPE 16687 (1987), describes quantitative shale stabilization testing. High molecular weight polymers including polyacrylamides are said to be effective when combined with potassium ions. B. C. Chesser International Association of Drilling Contracters/Society of Petroleum Engineers (IADC/SPC) 14757 (1986), describes the techniques of using high molecular weight organic polymers, specifically partially hydrolyzed polyacrylamide for shale stabilization. G. M. Bol, IADC/SPE 14802 (1986), describes the effects of various polymers and salts on borehole and cutting stability in water-based drilling fluids. Polymers tested included polyacrylamide and biopolymers such as cellulose-based polymers, xanthan gum and succinoglycan. Ronald P. Steiger, Journal of Petroleum Technology, pp. 1661-1670, August 1982, describes relatively simple potassium/polymer drilling fluid systems, comprising a high molecular weight partially hydrolyzed polyacrylamide. R. K. Clark et al., Journal of Petroleum Technology, pp. 719-727, June 1976, describes a polyacrylamide/potassium chloride mud for drilling water-sensitive shales.

Water soluble tetrapolymers of N-vinylpyrrolidone, acrylamide, acrylic acid salt and an N-alkylacrylamide are disclosed in U.S. Pat. No. 4,663,408 to Schultz et al. The polymer is prepared by terpolymerization of the acrylamide, N-substituted acrylamide and the pyrrolidone by free radicals in an aqueous medium followed by base catalyzed hydrolysis to partially convert the amide radicals to acrylate salt radicals. The tetrapolymer is said to be useful as aqueous or brine solution viscosifiers.

U.S. Pat. No. 4,673,716 to Siano discloses water soluble copolymers of acrylamide, oil soluble higher alkylacrylamide, and alkali metal acrylate to provide efficient viscosification of water or brine. The synthesis of the polymer relies on the complete solubilization of the water insoluble monomer into an aqueous solution of the water soluble monomers by means of a water soluble surfactant. The polymer may also be post-treated by the addition of base in order to produce a partial hydrolysis of the acrylamide to give a metal salt of acrylic acid.

U.S. Pat. No. 4,719,021 to Branch, III discloses shale stabilizing drilling fluids containing polyvalent metal/guanidine complexes.

U.S. Pat. No. 4,757,862 to Naimen et al. discloses water-soluble copolymers of a vinyl carboxyamide and a hydroxy-containing vinyl carboxylic ester which are essentially free of cross-linking.

U.S. Pat. No. 4,921,903 to Fong, which is hereby incorporated herein by reference, discloses a process for making a random transamidated acrylamide terpolymer as a water-in-oil emulsion.

Gray et al., Composition and Properties of Oil Well Drilling Fluids, 4th Ed., Gulf Publishing Co., Houston, Tex. (1980), pp. 414-421, describes the effect of mud properties on drilling rate. Density is the most important property, but viscosity is also known to have a material influence. The lower the density and viscosity, the higher the drilling rate. Therefore, it is important that any shale stabilizer additive not result in excessive viscosification of the drilling fluid.

SUMMARY OF THE INVENTION

The present invention is based upon the discovery of low viscosity drilling fluids comprising random partially transamidated acrylamide copolymers having enhanced shale stabilizing properties. The transamidated acrylamide copolymer is preferably synthesized by first conducting an emulsion polymerization of an acrylamide homopolymer followed by partial conversion of the amide functionality to the secondary amide by transamidation, and to the acrylate salt by hydrolysis. Low viscosity drilling fluids, to which the shale stabilizing copolymer emulsion and potassium chloride have been added, synergistically retard shale hydration.

In one embodiment, the present invention provides a method for stabilizing a downhole water-sensitive shale formation comprising the steps of: inverting an emulsion of a transamidated acrylamide copolymer in water to form a concentrate; admixing the concentrate with a wellbore drilling fluid comprising potassium chloride, an optional viscosifying agent and a weighting agent wherein the drilling fluid has a density from about 8 to about 18 lb/gal and a kinematic viscosity from about 5 to about 30 centistokes; and circulating the drilling fluid through a wellbore adjacent the water-sensitive formation. The copolymer has the formula:

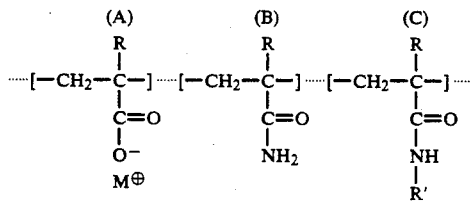

wherein R is hydrogen or a methyl group; M is hydrogen, an alkali metal, ammonium or amine cation; and R' is a hydrocarbyl group having from 1 to about 6 carbon atoms and preferably from 2 to about 5 carbon atoms. The copolymer comprises from about 2 to about 50 mole percent of the A repeat unit, preferably from about 25 to about 45 mole percent; from about 50 to about 98 mole percent of the B repeat unit, preferably from about 45 to about 73 mole percent; and from about 0.1 to about 15 mole percent of the C repeat unit, preferably from about 2 to about 10 mole percent. In a preferred embodiment, the drilling fluid has an effective downhole viscosity of less than about 20 centistokes.

In another embodiment, the present invention provides a drilling fluid suitable for stabilizing a downhole water-sensitive shale formation in oil and gas production, comprising an aqueous solution of the random partially transamidated acrylamide copolymer described above, potassium chloride, an optional viscosifying agent and a weighting agent. The copolymer has a reduced specific viscosity (RSV) of from about 1 to about 60, preferably from about 20 to about 50 (as determined from a solution of 0.045 weight percent polymer in 1M sodium nitrate at 30° C.). The drilling fluid has a copolymer concentration of from about 0.04 to about 1.8 pounds per barrel and a potassium chloride concentration of from about 5 to about 50 pounds per barrel. The drilling fluid has a density from about 8 to about 18 pounds per gallon, and a kinematic viscosity from about 5 to about 30 centistokes.

DETAILED DESCRIPTION OF THE INVENTION

The drilling fluid of the present invention is suitable for stablizing sensitive shale formations. The fluid comprises an aqueous solution of a random partially transamidated acrylamide copolymer wherein the amide functionality is partially converted to an acrylate salt by hydrolysis and to a secondary amide by transamidation. The shale stabilizing copolymer is preferably added to the drilling fluid as a water-in-oil emulsion.

As used herein, the term "copolymer" is defined conventionally as a polymer comprising two or more monomeric repeat units.

The copolymer preferably has the formula:

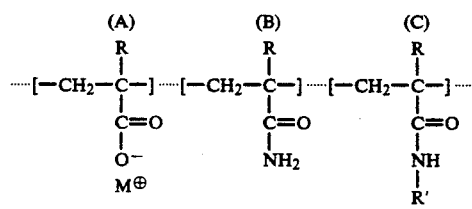

wherein R is hydrogen or a methyl group; M is hydrogen, an alkali metal, ammonium or amine cation; and R' is a hydrocarbyl group having from 1 to about 6 carbon atoms, and preferably from 2 to about 5 carbon atoms. The copolymer comprises from about 2 to about 50 mole percent of the A repeat unit, preferably from about 25 to about 45 mole percent; from about 50 to about 98 mole percent of the B repeat unit, preferably from about 45 to about 73 mole percent; and from about 0.1 to about 15 mole percent of the C repeat unit, preferably from about 2 to about 10 mole percent.

Suitable hydrocarbyl groups (R') substituted at the —NH— position of repeat unit C include, for example, aliphatic and cycloaliphatic groups. Representative examples include methyl, propyl, n-butyl, cyclohexyl, and the like moieties. Hydrocarbyl groups may contain a minor amount of non-hydrocarbyl elements (e.g. oxygen) or unsaturation within their structure such as hydroxy, alkoxy, and the like. Representative examples of substituted hydrocarbyl moieties include hydroxyethyl, ethoxyethyl, tris(hydroxymethyl)ethyl, and the like.

A particularly preferred copolymer comprises between about 3 to about 10 mole percent of propyl substituted secondary amide units C, between about 25 to about 45 mole percent of carboxylate salt units A and between about 45 to about 73 mole percent of primary amide units B.

Suitable copolymers generally have a reduced specific viscosity (RSV) of between about 1 to about 60, preferably between about 20 to about 50. As used herein, RSV is based on a solution of 0.045 percent by weight polymer in 1M sodium nitrate at 30° C. The copolymer has a molecular weight of at least about 50,000, preferably at least about 500,000 and most preferably 1,000,000 or greater. In most shale stabilizing applications, the copolymer has a molecular weight between about 1,000,000 and about 20,000,000. The copolymer molecular weight should not be so great as to become insoluble in water.

A drilling fluid suitable for stabilizing a downhole formation containing water sensitive shales can be prepared by admixing a sufficient quantity of the copolymer with a conventional low-viscosity, aqueous-based drilling fluid or "mud" as it is sometimes called. The mud contains the copolymer in an amount of from about 0.04 to about 1.8 pounds per barrel of drilling fluid (about 0.01 to about 0.5 percent by weight of the mud), preferably from about 0.07 to about 0.9 pounds copolymer per barrel.

The drilling fluid preferably also contains potassium chloride salt. The potassium cations act synergistically with the copolymer to stabilize shale formations. KCl is typically used for its economy and effectiveness although other soluble potassium salts can be used. For drilling fluids based on brines or seawater, the naturally occuring concentrations of potassium chloride can be sufficient. For a fresh water drilling fluid, KCl is preferably used in an amount of from about 5 to about 50 pounds per barrel of drilling fluid, preferably from about 15 to about 35 pounds per barrel. Other salts can be present especially when naturally occuring as in, for example, seawater or brine based drilling fluids.

The shale stabilizing copolymers are preferably utilized in low solids/low density aqueous drilling fluids. Representative examples of suitable mud types include clear water systems comprising fresh, salt and seawater with dispersed or non-dispersed bentonite. These muds can be optionally weighted with a conventional weighting agent such as barite, and will have a density from about 8 to about 18 pounds per gallon.

Drilling muds of the present invention preferably have a pH of between about 8.5 and about 10 and a soluble calcium ion concentration of below about 300 ppm. The drilling fluid is stable up to a temperature of about 350° F. and has compatibility with most other anionic and non-ionic polymers. Drilling fluids comprising the copolymer have sufficient, but relatively low viscosity for excellent bore cleaning properties, yet are also thinned under shear for reduced drag. In a preferred embodiment the present drilling fluid has an effective downhole viscosity of from about 5 to about 30 centistokes, and especially less than about 20 centistokes. Low viscosity at the bit allows a high drilling rate to be obtained by using the drilling fluid. In addition, good lubrication properties help reduce pipe torque.

The drilling fluid may contain other conventional additives such as, for example, lubricants, polymeric viscosifying agents, bactericides, breakers, iron control agents, foaming agents such as surfactants, gases or liquified gases, proppants, and the like.

Typical viscosifying agents include soluble polysaccharides such as galactomannan gums (guar), glucomannan gums, cellulose derivatives, and the like.

A precursor polymer of the present invention generally comprises a homopolymerized primary amide of an $\alpha,\beta$-ethylenically unsaturated carboxylic acid. The precursor polymer may, however, be a copolymer of an unsaturated carboxylic acid and the unsaturated amide. The precursor homo- or copolymer is preferably subsequently modified by transamidation and hydrolysis where appropriate to synthesize the partially transamidated copolymer. Alternately, the hydrophobic acrylamide copolymer can be polymerized directly by vinyl polymerization techniques known in the art.

Representative amide monomers are amides of $\alpha,\beta$-ethylenically unsaturated carboxylic acids including acrylamide, methacrylamide, crotonamide, cinnamamide and the like. Amides of unsaturated dicarboxylic acids may be used, including partial and whole amides of succinic acid, itaconic acid, and the like. Preferred amide monomers are acrylamide and methacrylamide. For purposes of illustration and clarity, these preferred monomers are used hereinbelow as non-limiting representative examples.

Where the precursor acrylamide polymer is an as-polymerized copolymer, the comonomer may comprise an $\alpha,\beta$-ethylenically unsaturated carboxylic acid such as acrylic acid, methacrylic acid, and the like.

The partially transamidated acrylamide copolymer is preferably synthesized by first preparing the precursor acrylamide homo- or copolymer by free radical emulsion polymerization followed by subsequent transamidation and hydrolysis where appropriate. Such polymerization is disclosed, for example, in U.S. Pat. No. 4,921,903 to Fong, which has been incorporated herein by reference, but can be briefly summarized as follows: preparing an aqueous solution of the acrylamide monomer; making an emulsion of the monomer solution with a hydrophobic organic liquid using an emulsifying agent; and polymerizing the emulsion using a free radical initiator.

The acrylamide monomer generally comprises from about 5 to about 60 percent by weight of the emulsion, preferably from about 20 to about 50 percent by weight, and more preferably from about 25 to about 40 percent by weight of the emulsion, depending on the desired polymer solids content in the product latex. The reaction is generally allowed to continue until no monomer remains. Water generally comprises from about 20 to about 90 percent by weight of the emulsion, preferably from about 20 to about 70 percent by weight, and more preferably from about 30 to about 55 percent by weight of the emulsion.

Suitable hydrophobic liquids or oils comprise a large group of organic hydrocarbons. Paraffinic hydrocarbon oils, generally known as low odor paraffinic solvent (LOPS) and exemplified by ISOPAR M solvent, are preferred. Other liquids include mineral oil, kerosenes, naphthas, and unrefined petroleum. Solvents such as benzene, xylene, and low flash point hydrocarbons can be used but are generally avoided due to toxicity or other problems. Hydrophobic liquids comprise from about 5 to about 75 percent by weight of the emulsion, preferably from about 5 to about 40 percent by weight, and more preferably from about 20 to about 30 percent by weight of the emulsion. Generally the water-in-oil emulsions of this invention can be characterized as having water:oil ratios of from about 0.25 to about 18, preferably from about 0.5 to about 14 and more preferably from about 1.0 to about 2.75.

Any conventional water-in-oil emulsifying agent can be used including sorbitan monostearate (SPAN-80), sorbitan monooleate, and the like. So-called low hydrophilic-lipophilic balance (HLB) materials can also be found in the Atlas HLB surfactants selector. A preferred surfactant system comprises a mixture of one or more polysoap surfactants commercially available under the tradenames RAPISOL B-246 and PA-18. The surfactant generally comprises from about 0.1 to about 20 percent by weight of the emulsion, preferably from about 1 to about 10 percent by weight, and more preferably from about 1.2 to about 10 percent by weight of the emulsion.

Suitable free radical initiators may be either oil or water soluble selected from the group consisting of organic peroxides, azo type initiators, redox systems and the like. Preferred initiators are azo compounds such as 2,2'-azobisisobutyronitrile (AIBN), 2,2'- azobis(2,4-dimethyl-4-methoxyvaleronitrile), and the like. Use of low temperature initiators such as the latter lead to desired higher molecular weights. The free radical initiator is generally used in an amount of from about 0.001 to about 2.0 grams of initiator per 100 grams of monomer, preferably from about 0.01 to about 1.0 grams initiator per 100 grams monomer, more preferably about 0.05 to about 0.1 grams initiator per 100 grams monomer.

Polymerization is generally conducted under agitation at a temperature of from about 10° C. to about 90° C., preferably from about 20° C. to about 60° C., for a time period of from about 1 to about 24 hours, preferably from about 3 to about 8 hours.

The emulsions thus formed of the finely divided acrylamide polymer are quite stable and contain relatively large concentrations of polymer. The stable emulsions are characterized by a particle size ranging from about 0.1 microns up to about 5 microns. The preferred particle size is from about 0.2 to about 3.0 microns, more preferably from about 0.2 to about 2.0 microns. The emulsions will generally have a viscosity range of from about 50 to about 3000 cps, however, final viscosity will depend on many factors including polymer content, oil or water concentration, choice of emusifier, and particle size.

The precursor acrylamide polymer is preferably modified by transamidation with a primary hydrocarbyl amine for conversion of a portion of the primary amide functionality into the secondary amide functionality. While preferred amines are primarily aliphatic hydrocarbyl substituted amines, such compounds may contain minor amounts of other elements within their hydrocarbon structure such as oxygen. Examples of suitable primary amines include methylamine, ethylamine, propylamine, ethanolamine, cyclohexylamine, and, tris(hydroxymethyl)aminoethane.

The transamidation reaction is generally conducted by mixing the primary amine with the acrylamide polymer emulsion at a temperature between about 120° C. and 180° C., preferably between about 130° C. to about 160° C. for a time period of 30 minutes to 6 hours or more or until the desired conversion is obtained. The primary amine may be optionally partially or wholly neutralized. When transamidation is conducted, a portion of the primary amide functionality is concomitantly hydrolyzed to the acrylate salt. Thus transamidated and hydrolyzed, the hydrophobic acrylamide copolymer useful as a shale stabilizer is produced.

The precursor homopolymer may be separately hydrolyzed by a base prior to transamidation. Hydrolysis is generally conducted under agitation by addition of NaOH, for example, for such a period of time and temperature, at a concentration sufficient to cause the desired degree of conversion to the acrylate salt. The copolymer may be recovered from the emulsion, if desired, by precipitation with non-solvents such as acetone and methanol. Alternatively, the copolymer may be recovered by evaporation of the emulsion liquids by application of heated air or nitrogen.

The drilling fluid can be formulated in advance of actual drilling. Alternatively, the copolymer stabilizer can be added to a drilling fluid of a well in progress. The drilling fluid should be monitored by regular sampling and analysis to maintain an adequate concentration of the copolymer. A commonly used analysis techinque involves vigorous hydration of the polymer amide functionality wherein evolved ammonia may be measured and correlated to copolymer concentration.

To utilize the copolymer of the present invention from the emulsion or latex, inversion in fresh water preferably precedes blending into a salt-containing aqueous drilling fluid. Because the inversion rate is slow in salt water, preparation of a fresh water concentrate will permit the full shale stabilization activity of the present invention copolymer to be obtained prior to injection to the formation. By inversion, it is meant that the copolymer of the hydrophobic phase is released into the aqueous phase and dispersed. Inversion of the emulsified copolymer greatly reduces the time otherwise required to dissolve a solid copolymer.

The concentrate typically comprises the copolymer emulsion diluted with fresh water to about 0.3 to about 3 percent by weight active (i.e. copolymer concentration), preferably to about 0.5 to about 1.5 percent by weight active. A hydrophilic surfactant dissolved in the concentrate may be used to enhance inversion rate. Examples of such surfactants include ethoxylated nonyl phenols, ethoxylated nonyl phenol formaldehyde resins, dioctyl esters of sodium succinate, and the like. The surfactant may be used in an amount of about 0.01 to about 50 percent by weight of the copolymer present, preferably from about 1 to about 10 percent by weight.

The concentrate can be mixed in any vessel present in a mud pit in an oil and gas drilling operation. The concentrate is preferably agitated by a cone drive mixer, for example, in a suitable tank or pit for about 1 to about 5 hours, preferably at least about 3 hours, for inversion to take place. Further details regarding inversion techniques and equipment may be found in U.S. Pat. No. 3,624,019 to Anderson which is hereby incorporated herein by reference.

The concentrate can subsequently be injected into the mud circulation system at any one or more of several points, including, for example, the mud pump suction, hopper, mud suction pit, return line (prior to the drill solids removal system), the drill pipe, and the like.

The present invention is illustrated by the following examples:

EXAMPLES 1-10

An acrylamide precursor polymer was partially transamidated with several selected primary alkylamines to synthesize the copolymers of the present invention.

To prepare the backbone polyacrylamide polymer, a monomer phase was made by combining 625 g acrylamide monomer, 38 g deionized water, 2.80 g boric anhydride, 0.20 g ethylenediaminetetraacetic acid (EDTA) and 8.00 g NaCl. An oil phase was made by combining 293 g LOPS, 15.0 g SPAN-80, 15.0 g RAPISOL B-246 and 3.00 g SCHERCOMID 50A emulsifiers. The monomer phase was slowly added to the oil phase in a ROSS emusifier at low speed, then mixed at high speed for 1 minute. The mixture was homogenized on a model H-5000 colloid mill at a setting of 800 lbs and added to a resin reactor with a $N_2$ purge. The reaction mixture was heated to 45° C. and 0.10 g of VAZO 64 and 0.02 g of VAZO 52 initiators were added. The polymerization mixture was maintained at 45° C. for 4 hours, then at 65° C. for one hour. The agitation speed was 1000 rpm. The product latex had a fairly low gel concentration and an RSV of about 21. The latex comprised about 30.5 wt % polyacrylamide homopolymer, 35.8 wt % water and 29.3 wt % LOPS.

Transamidation was conducted at 140° C. using 10 mole percent amine for 4 hours. At the end of this time, the reaction effluent was analyzed by either gas or liquid chromatography for the presence of residual amine reactant. To prepare Example 5, 4.28 g n-propylamine and 16.42 g deionized water were slowly added to 165 g latex (50.3 g polyacrylamide) and 6.5 g SPAN-80 with stirring in a $N_2$ purged, heated reaction flask. If a neutralized amine was used, $H_2SO_4$ was added with the amine reactant using a 1:1 molar ratio. The results are presented in Table 1.

TABLE 1

| Example | Amine | Neutralized | RSV | —COO⁻ (mole %) | 2° Amide (mole %) |
|---|---|---|---|---|---|
| 1 | methyl | no | 39.6 | 44 | 9.6 |
| 2 | methyl | yes | 35.7 | 25 | 8.8 |
| 3 | ethyl | no | 48.1 | 45 | 8.5 |
| 4 | ethyl | yes | 35.6 | 22 | 7.3 |
| 5 | propyl | no | 48.2 | 40 | 8.7 |
| 6 | propyl | no | 55.0 | 43 | 7.1 |
| 7 | propyl | yes | 31.0 | 31 | 6.4 |
| 8 | propyl | yes | 32.3 | 22 | 7.0 |
| 9 | cyclohexyl | no | 58.0 | 49 | 3.5 |
| 10 | cyclohexyl | yes | 40.0 | 21 | 3.2 |
| Comp. 6 | soyaalkyl | no | 25.6 | 24 | 4.0 |
| Comp. 7 | soyaalkyl | no | 27.9 | 24 | 3.0 |

EXAMPLES 11-18 AND COMPARATIVE EXAMPLES 1-2

In the following examples and comparative examples, the water inhibition activity of several of the copolymers prepared in Examples 1-10 was tested on shale samples. The procedure comprised mixing the shale sample with the copolymer emulsion either alone or combined with KCl. Results were compared to a partially hydrolyzed polyacrylamide copolymer (PAA, 30 wt % hydrolyzed) emulsion of the prior art. Results of laboratory water inhibition results were utilized to screen copolymer emulsions for subsequent triaxial testing.

Initially coarse VOLCLAY shale samples were obtained from Wyo-Ben. This shale is a high swelling bentonite clay. Initial examination and testing showed that VOLCLAY contained two distinct types of shale distinguished by color and swelling characteristics. One type was yellowish and more susceptible to swelling than the other which was dark grey. Consequently, prior to testing, shale samples were separated by color to obtain meaningful results. Tests were performed on the grey shale. Since some variation was expected from each batch of shale, standardization tests were performed initially on the batch using PAA for comparison.

Test shale (pre-separated) was oven dried at 80° C. for 1 hour in 15 to 25 g samples. Test solutions were prepared by blending the subject copolymer emulsion with 350 ml of liquor (either tap water or a formulated drilling mud) in a Hamilton Beach malt multimixer. Test solutions containing shale pieces were subsequently placed into an aging cell and hot rolled for 16 to 20 hours at 66° C. After aging, the cells were cooled to room temperature and the contents were poured through a Buchner funnel without filter paper into a 500 ml graduated cylinder. The shale was visually evaluated for firmness and size and compared to the original appearance. The shale wet weight was obtained. The dry weight was obtained following overnight drying between about 80° C. and 90° C. in a vacuum oven. A shale recovery percentage was calculated from these weight differences. Greater than 100% recovery reflected the presence of various additives in the liquor. Percent water inhibition was calculated by comparing the final dry weight to the wet weight. The more effective the water inhibition of the composition, the lower the wet weight. The volume of water recovered by filtration was measured and evaluated by appearance. After each test, a subjective evaluation of the shale appearance was made. Table 2 explains the terms used.

TABLE 2

| Shale Rating | Description |
|---|---|
| 9 | Hard shale - close to original size, shape and hardness. |
| 8 | Hard shale as above but containing some grit. |
| 7 | Hard pieces - a little smaller than original and not quite as hard. |
| 6 | Firm pieces - ranging from a little smaller than the original to medium (approx. ½ size to small ¼ size), fairly easy to crush. |
| 5 | Chips - similar in integrity to firm pieces but much smaller. |
| 4 | Grit - similar to sand, firm but small. |
| 3 | Soft and highly swollen - original shale pieces recognizable but much larger and very easy to smear. |
| 2 | Soft with little integrity - original shale pieces recognizable but very fragile; turns into a gelled mass if funnel is shaken. |
| 1 | Soft without integrity - thick gelled mass which would not pass through the filter. |
| 0 | Completely dispersed - passed through the filter. |

Some variation was expected from each batch of shale. Therefore, standardization tests were done initially on the shale batch using hydrolyzed PAA, with and without KCl. The results are presented in Table 3.

TABLE 3

| | Additive (g active/350 ml) | | Shale Weight (g) | | | Shale Recovered (%) | Water Inhibition (%) | Shale Rating |
|---|---|---|---|---|---|---|---|---|
| Run | PAA | KCl | Initial | Wet | Dry | | | |
| 1 | 0 | 0 | 14.8 | 1.7 | 1.5 | 10.1 | 88.2 | 1 |
| 2 | 0 | 0 | 14.7 | 1.4 | 1.3 | 8.8 | 92.9 | 1 |
| 3 | 0 | 0 | 14.6 | 1.7 | 1.7 | 11.6 | 100.0 | 1 |
| Average | | | | | | 10.2 | 93.7 | |
| Standard Deviation (% of Ave.) | | | | | | 13.7 | 6.3 | |
| 4 | 0.30 | 0 | 14.6 | 121.2 | 11.2 | 76.7 | 9.2 | 3 |
| 5 | 0.30 | 0 | 14.9 | 124.7 | 12.8 | 85.9 | 10.2 | 3 |
| 6 | 0.30 | 0 | 15.0 | 118.6 | 12.0 | 80.0 | 10.1 | 3 |
| 7 | 0.30 | 0 | 15.2 | 136.3 | 13.4 | 88.2 | 9.8 | 3 |
| 8 | 0.30 | 0 | 14.7 | 142.1 | 13.0 | 88.4 | 9.1 | 3 |
| Average | | | | | | 83.8 | 9.7 | |
| Standard Deviation (% of Ave.) | | | | | | 6.2 | 5.2 | |
| 9 | 0.30 | 10 | 15.0 | 22.9 | 15.6 | 104.0 | 68.1 | 7 |

TABLE 3-continued

| | Additive (g active/350 ml) | | Shale Weight (g) | | | Shale Recovered | Water Inhibition | Shale |
|---|---|---|---|---|---|---|---|---|
| Run | PAA | KCl | Initial | Wet | Dry | (%) | (%) | Rating |
| 10 | 0.30 | 10 | 15.0 | 21.8 | 15.0 | 100.0 | 68.8 | 8 |
| 11 | 0.30 | 10 | 14.9 | 20.8 | 15.0 | 100.7 | 72.1 | 8 |
| 12 | 0.30 | 10 | 15.0 | 21.5 | 15.0 | 100.0 | 69.8 | 8 |
| 13 | 0.30 | 10 | 15.0 | 21.5 | 14.8 | 98.7 | 68.8 | 8 |
| 14 | 0.30 | 10 | 14.9 | 20.5 | 15.0 | 100.7 | 73.2 | 8 |
| 15 | 0.30 | 10 | 15.0 | 19.8 | 14.9 | 99.3 | 75.3 | 8 |
| Average | | | | | | 100.5 | 70.9 | |
| Standard Deviation (% of Ave.) | | | | | | 1.7 | 3.8 | |

Results of the water inhibition testing with the copolymer of this invention are shown in Table 4. In comparison to the prior art PAA, the present invention copolymer gave enhanced water inhibition in the lab at lower weight percent active polymer (170 mg active versus about 300 mg active for the PAA). The synergistic effects of polyacrylamide based inhibitors and KCl are statistically indicated by the data in Table 4.

EXAMPLES 19-30 AND COMPARATIVE EXAMPLE 3-4

In the following examples, further screening for water inhibition was undertaken utilizing copolymers prepared in Examples 1-10. The screening procedure was the same as that described in Examples 11-18 and Comparative Examples 1-2. Results are shown in Table

TABLE 4

| Example | Copolymer | Concentration (g active/350 ml) | | Shale Weight (g) | | | Shale Recovered (%) | Water Inhibition (%) | Shale Rating |
|---|---|---|---|---|---|---|---|---|---|
| | | Copolymer | KCl | Initial | Wet | Dry | | | |
| Blank | N/A | 0 | 0 | 14.7 | 1.4 | 1.3 | 8.8 | — | 1 |
| 11 | Example 6 | 0.17 | 0 | 15.5 | 200.1 | 22.4 | >100.0 | 11.2 | 3 |
| 12 | Example 7 | 0.17 | 0 | 14.9 | 171.3 | 24.6 | >100.0 | 14.3 | 3 |
| 13 | Example 9 | 0.17 | 0 | 15.5 | 85.4 | 13.5 | 87.1 | 15.8 | 3 |
| 14 | Example 10 | 0.17 | 0 | 15.6 | 205.1 | 18.4 | >100.0 | 9.0 | 3 |
| Comparative 1 | PAA | 0.30 | 0 | 14.9 | 124.7 | 12.8 | 85.9 | 10.2 | 3 |
| KCl Blank | N/A | 0 | 10 | 15.2 | — | — | — | — | 0 |
| 15 | Example 6 | 0.17 | 10 | 15.1 | 22.0 | 15.0 | 99.3 | 68.2 | 9 |
| 16 | Example 7 | 0.17 | 10 | 15.0 | 20.2 | 15.2 | >100.0 | 75.2 | 9 |
| 17 | Example 9 | 0.17 | 10 | 15.4 | 23.5 | 14.7 | 95.5 | 62.6 | 8 |
| 18 | Example 10 | 0.17 | 10 | 15.1 | 22.9 | 13.9 | 92.1 | 60.7 | 8 |
| Comparative 2 | PAA | 0.30 | 10 | 14.9 | 20.8 | 15.0 | >100.0 | 72.1 | 8 |

From the data reported in Table 4, it is seen that only 170 mg/350 ml in the case of the transamidated copolymer is just as or more effective as the partially hydrolyzed PAA at the higher proportion of 300 mg/350 ml. This demonstrates that the present transmidated copolymer is surprisingly more effective at a lower concentration than the hydrolyzed PAA.

5. Data tabulated represent an average of 10 or 11 runs.

TABLE 5

| Example | Copolymer | Concentration (g active/350 ml) | | Number of Runs | Average Water Inhibition (%) | Standard Deviation (% of Ave.) |
|---|---|---|---|---|---|---|
| | | Copolymer | KCl | | | |
| 19 | Example 1 | 0.15 | 10 | 11 | 47.7 | 4.4 |
| 20 | Example 2 | 0.15 | 10 | 10 | 48.1 | 7.7 |
| 21 | Example 3 | 0.15 | 10 | 11 | 48.2 | 8.7 |
| 22 | Example 4 | 0.15 | 10 | 10 | 48.8 | 7.8 |
| 23 | Example 5 | 0.15 | 10 | 10 | 49.3 | 3.2 |
| 24 | Example 8 | 0.15 | 10 | 11 | 49.5 | 4.2 |
| Comparative 3 | PAA | 0.15 | 10 | 10 | 45.5 | 7.0 |
| 25 | Example 1 | 0.30 | 10 | 11 | 51.4 | 7.4 |
| 26 | Example 2 | 0.30 | 10 | 10 | 54.2 | 9.4 |
| 27 | Example 3 | 0.30 | 10 | 10 | 53.9 | 7.8 |
| 28 | Example 4 | 0.30 | 10 | 10 | 52.6 | 7.2 |
| 29 | Example 5 | 0.30 | 10 | 10 | 53.1 | 7.7 |
| 30 | Example 8 | 0.30 | 10 | 10 | 55.1 | 8.3 |
| Comparative 4 | PAA | 0.30 | 10 | 11 | 48.8 | 5.9 |

EXAMPLE 31 AND COMPARATIVE EXAMPLE 5

In the following example and comparative example, a triaxial test apparatus was used to estimate shale stabilization under simulated downhole drilling conditions. Triaxial testing utilizes a pressurized drilling fluid circulated through a specially prepared core sample held under axial and radial pressure conditions. The shale of the previous examples and comparative examples was molded into cores. Drilling fluids were formulated comprising the Example 5 copolymer (N-propyl substituted acrylamide/sodium acrylate copolymer (40 wt % sodium acrylate, 8.7 wt % secondary amide, RSV=48.2)) and the PAA prior art copolymer (30 wt % hydrolyzed). The tests consisted of circulating the drilling fluid through the core at a set of constant test conditions until the core failed. To accelerate time to failure, KCl was not added to the copolymer/tap water solutions.

Triaxial testing is a known testing procedure in the art. Tests were carefully conducted to insure reproducibility. First, the core was prepared with careful attention to detail. Shale samples were ground and passed through a 30 mesh sieve. The ground shale was dried in a vacuum oven for about 24 hours at 220° F. Filter paper in a compaction cell was wetted with 1 ml of 3% NaCl and 113 g of shale was weighed out to the nearest 0.01 g. The shale was loaded into the compaction cell by funnel and 25 ml of 3% NaCl solution was added on top. The cell was pressurized initally at 3,000 psi for 10 min, 5,000 psi for 10 min, 7,500 psi for 10 min then finally 10,000 psi for 20 hour. When the core was removed it was weighed to the nearest 0.01 g. The core was then sealed in a plastic bag until use (at least 24 hours). The core had a 2-inch outside diameter and a 1-inch length with a ¼-inch inside diameter.

Test solutions were prepared by slowly adding the appropriate amount of polymer emulsion to stirred tap water so that 30 gal of 0.085 wt. % solution based on polymer activity was formulated. Approximately 3 gal was used per test.

When the triaxial test was conducted, a core weighing 116 g to the nearest 0.5 g was selected and loaded to the triaxial tester. The pressure on the core was increased slowly so that axial pressure was 1200 psi, radial pressure was 2500 psi and fluid pressure was 100 psi.

After completion of the run, the core was examined for type of failure and weighed to the nearest 0.01 g. It was then dried in a vaccuum oven at 220° F. for about 24 hours (to the nearest hour). After drying the core was cooled to room temperature in a dessiccator then weighed to the nearest 0.01 g.

Also important for insuring reproducibility, was careful cleanup procedure between tests. After all the fluids from the system were drained, a chlorine bleach solution was circulated through the solution for 30 minutes (250 ml bleach in 3 gal tap water). Next, the system was drained and a 100 ml fluid sample was tested for polymer flocculates by an addition of a small amount of alum or aluminum chloride. The above steps were repeated until no polymer flocculates appeared. Next, tap water was circulated for 30 minutes, then drained and tested for the presence of residual chlorine. Repeated tap water circulation steps were carried out until chlorine was undetectable.

Tests were repeated 9 times for each polymer, and the results are shown in Table 6.

TABLE 6

| Example-Run | Copolymer | Concentration (wt %) | Run Time (minutes) | Erosion (%) | Average Erosion Rate (%/100 minutes) |
|---|---|---|---|---|---|
| Comp 5-1 | PAA | 0.085 | 334.57 | 13.17 | 3.936 |
| Comp 5-2 | | | 323.00 | 12.94 | 4.006 |
| Comp 5-3 | | | 317.51 | 12.77 | 4.022 |
| Comp 5-4 | | | 333.65 | 13.00 | 3.896 |
| Comp 5-5 | | | 344.71 | 13.02 | 3.777 |
| Comp 5-6 | | | 357.01 | 13.53 | 3.790 |
| Comp 5-7 | | | 341.73 | 13.24 | 3.874 |
| Comp 5-8 | | | 361.88 | 13.46 | 3.719 |
| Comp 5-9 | | | 337.07 | 13.27 | 3.937 |
| Average | | | 339.01 | 13.16 | 3.884 |
| Standard Deviation (% of Ave.) | | | 4.2 | 1.9 | 2.7 |
| 31-1 | Example 5 | 0.085 | 424.78 | 14.59 | 3.434 |
| 31-2 | | | 431.24 | 13.89 | 3.221 |
| 31-3 | | | 410.99 | 14.67 | 3.569 |
| 31-4 | | | 391.46 | 14.61 | 3.732 |
| 31-5 | | | 440.05 | 13.51 | 3.070 |
| 31-6 | | | 409.71 | 14.66 | 3.578 |
| 31-7 | | | 377.44 | 14.70 | 3.895 |
| 31-8 | | | 399.08 | 14.43 | 3.616 |
| 31-9 | | | 427.3 | 14.68 | 3.436 |
| Average | | | 412.45 | 14.42 | 3.506 |
| Standard Deviation (% of Ave.) | | | 5.0 | 2.9 | 7.2 |

Shale cores tested using the present invention copolymer lasted about 20% longer than the PAA prior art copolymer, demonstrating that the present copolymer is superior to the PAA.

COMPARATIVE EXAMPLES 6 AND 7

The water inhibition test was used to evalute the shale inhibition of two hydrolyzed polyacrylamides transamidated with soyaalkylamine ($C_{16}$–$C_{18}$) obtained from AKZO Chemical, Inc. under the designation ARMEEN S. The results are presented in Table 7.

TABLE 7

| Example-Run | Copolymer Amine | Concentration (g active/350 ml) Copolymer | KCl | Shale Weight (g) Initial | Wet | Dry | Shale Recovered (%) | Water Inhibition (%) | Shale Rating |
|---|---|---|---|---|---|---|---|---|---|
| Comparative 6-1 | ARMEEN S | 1.0 | 0 | 15.8 | 55.7 | 11.8 | 74.7 | 21.2 | 3 |
| Comparative 7-1 | ARMEEN S | 1.0 | 0 | 15.6 | 67.0 | 12.4 | 79.5 | 18.5 | 3 |

TABLE 7-continued

| Example-Run | Copolymer Amine | Concentration (g active/350 ml) Copolymer | KCl | Shale Weight (g) Initial | Wet | Dry | Shale Recovered (%) | Water Inhibition (%) | Shale Rating |
|---|---|---|---|---|---|---|---|---|---|
| Comparative 6-2 | ARMEEN S | 1.0 | 10 | 15.3 | 32.4 | 14.6 | 95.4 | 45.1 | 4 |
| Comparative 7-2 | ARMEEN S | 1.0 | 10 | 15.1 | 27.1 | 15.0 | 96.8 | 55.4 | 4 |

Comparative Examples 6 and 7 demonstrate the importance of a relatively small secondary amide group. When the Comparative Example 6 and 7 copolymers having soyaalkylamide groups were screened for shale stabilization, they performed poorly, yielding even less shale recovery than the hydrolyzed PAA copolymer (Comparative Example 1) although used at a much higher concentration. Also note the copolymer/KCl water inhibition requires 1.0 pound per barrel of the Comparative Example 6 and 7 copolymers for marginally comparative results in comparison with the materials of Examples 1-10.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A method for stabilizing a downhole shale formation, comprising the steps of:
   (a) inverting a water-in-oil emulsion comprising a random hydrophobic acrylamide copolymer having the formula:

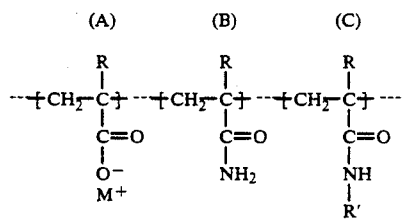

wherein R is a hydrogen or methyl group, M is hydrogen, an alkali metal, ammonium or amine group, and R' is an hydrocarbyl group having from 1 to about 6 carbon atoms, said inverted emulsion forming a polymer concentrate, wherein said (A) repeat units comprise from about 2 to about 50 mole percent of said copolymer, said (B) repeat units comprise from about 50 to about 98 mole percent of said copolymer and said (C) repeat units comprise from about 0.1 to about 15 mole percent of said copolymer;
   (b) preparing an aqueous drilling fluid comprising a sufficient amount of said concentrate to give a copolymer concentration of from about 0.04 to about 1.8 pounds per barrel, from about 5 to about 50 pounds per barrel of potassium chloride, and a weighting agent, wherein the drilling fluid has a density from about 8 to about 18 pounds per gallon and a viscosity from about 5 to about 30 centistokes; and
   (c) circulating said drilling fluid through a bore in the formation.

2. The method of claim 1, wherein said inversion step comprises diluting said copolymer emulsion with fresh water to a copolymer concentration of from about 0.5 to about 3 percent by weight and agitating said mixture for about 3 to about 5 hours.

3. The method of claim 1, wherein said drilling fluid has a copolymer concentration of from about 0.07 to about 0.9 pounds per barrel.

4. The method of claim 1, wherein said drilling fluid has a viscosity of less than about 20 centistokes.

5. The method of claim 1, wherein said copolymer has a reduced specific viscosity of from about 1 to about 60.

6. The method of claim 1, wherein said copolymer has a reduced specific viscosity of from about 20 to about 50.

7. The method of claim 1, wherein said (A) repeat units comprise from about 25 to about 45 mole percent of said copolymer, said (B) repeat units comprise from about 45 to about 73 mole percent of said copolymer and said (C) repeat units comprise from about 2 to about 10 mole percent of said copolymer.

8. The method of claim wherein said R' group has from 2 to about 5 carbon atoms.

9. The method of claim 1, wherein said copolymer is prepared by free radical emulsion polymerization and wherein a portion of said (B) repeat units are converted to (A) repeat units by hydrolysis and a portion of (B) repeat units are converted to (C) repeat units by transamidation.

10. The method of claim 1, wherein the drilling fluid includes a viscosifying agent selected from soluble polysaccharides and cellulose derivatives.

11. An aqueous based drilling fluid suitable for stabilizing a downhole shale formation, comprising:
   (a) from about 0.04 to about 1.8 pounds per barrel of a random hydrophobic acrylamide copolymer having the formula:

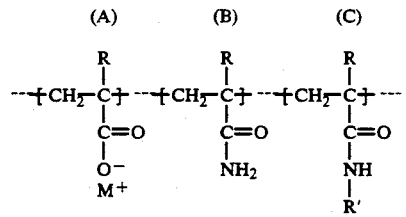

wherein R is a hydrogen or methyl radical, M is hydrogen, an alkali metal, ammonium or amine cation, and R' is an hydrocarbyl radical having from 1 to about 6 carbon atoms, wherein said (A) repeat units comprise from about 2 to about 50 mole percent of said copolymer, said (B) repeat units comprise from about 50 to about 98 mole percent of said copolymer and said (C) repeat units comprise from about 0.1 to about 15 mole percent of said copolymer;
   (b) from about 5 to about 50 pounds per barrel of potassium chloride;

(c) a weighting agent to provide a density from about 8 to about 18 pounds per gallon;
wherein the fluid has a viscosity of from about 5 to about 30 centistokes.

12. The fluid of claim 11, comprising from about 0.07 to about 0.9 pounds of said copolymer per barrel of said drilling fluid.

13. The fluid of claim 11, wherein the copolymer has a reduced specific viscosity of from about 1 to about 60.

14. The fluid of claim 11, wherein said copolymer has a reduced specific viscosity of from about 20 to about 50.

15. The fluid of claim 11, wherein said copolymer comprises $\alpha,\beta$-ethylenically unsaturated amides selected from the group consisting of crotonamide, cinnamide, and succinamide.

16. The fluid of claim 11, wherein said (A) repeat units comprise from about 25 to about 45 mole percent of said copolymer, said (B) repeat units comprise from about 45 to about 73 mole percent of said copolymer and said (C) repeat units comprise from about 2 to about 10 mole percent of said copolymer.

17. The fluid of claim 11, wherein said R' group has from 2 to about 5 carbon atoms.

18. The fluid of claim 11, wherein said copolymer is prepared by free radical emulsion polymerization and wherein a portion of said (B) repeat units are converted to (A) repeat units by hydrolysis and a portion of (B) repeat units are converted to (C) repeat units by transamidation.

19. The fluid of claim 11, further comprising a viscosifying agent selected from soluble polysaccharides and cellulose derivatives.

20. In the method of drilling a well bore through a sensitive clay formation comprising preparing a low viscosity drilling fluid containing a shale inhibiting polyacrylamide, and circulating the drilling fluid through the bore in contact with the formation, the improvement wherein the polyacrylamide comprises a random hydrophobic copolymer having the formula:

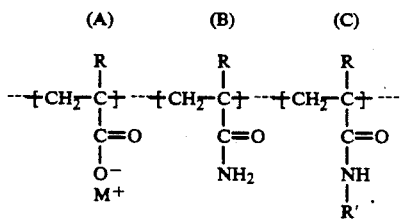

wherein R is a hydrogen or methyl group, M is hydrogen, an alkali metal, ammonium or amine group, and R' is an hydrocarbyl group having from 1 to about 6 carbon atoms, wherein said (A) repeat units comprise from about 2 to about 50 mole percent of said copolymer, said (B) repeat units comprise from about 50 to about 98 mole percent of said copolymer and said (C) repeat units comprise from about 0.1 to about 15 mole percent of said copolymer.

* * * * *